Nov. 23, 1971 H. A. GIESECKE 3,621,766
FORESHOOT SYSTEM
Filed Sept. 23, 1969 3 Sheets-Sheet 1

INVENTOR
HENRY A. GIESECKE

Richards, Harris & Hubbard
ATTORNEY

Nov. 23, 1971  H. A. GIESECKE  3,621,766
FORESHOOT SYSTEM

Filed Sept. 23, 1969  3 Sheets-Sheet 2

INVENTOR
HENRY A. GIESECKE

Richards, Harris & Hubbard
ATTORNEY

INVENTOR:
HENRY A. GIESECKE

United States Patent Office 3,621,766
Patented Nov. 23, 1971

3,621,766
FORESHOOT SYSTEM
Henry A. Giesecke, Oklahoma City, Okla., assignor to Apromat, Incorporated, Oklahoma City, Okla.
Filed Sept. 23, 1969, Ser. No. 860,219
Int. Cl. G03b
U.S. Cl. 95—1
13 Claims

ABSTRACT OF THE DISCLOSURE

A foreshoot system includes a portion of an exposing system having a foreshoot aperture formed through it. The member is activated to position the aperture on the optical axis of the exposing system and to simultaneously close a light flash activating contact. In one embodiment of the system, the aperture comprises a pinhole formed through one leaf of an iris diaphragm. The leaf is activated to cover the diaphragm opening and to open the pinhole. In another embodiment, the aperture is formed in a shutter blade and includes a lens system for directing light through a focal point located at the diaphragm of the exposing system.

BACKGROUND OF THE INVENTION

In the art of photography, the term foreshoot refers to a technique for reducing light sensitivity of a photographic emulsion. Typically, foreshooting is accomplished by exposing the emulsion for a very short period of time through a pinhole. This forms Fresnel zones of decreasing intensity which reduce the sensitivity of the center portion of the emulsion without changing the sensitivity of the edge portions.

In the past, most foreshooting systems have comprised a metal slide having a pinhole formed through it. In use, the slide, which is known as a Waterhouse stop, is positioned in a camera barrel through an opening known as a Waterhouse slot. The shutter of the camera is then opened and a flash of light is generated to effect the foreshoot exposure.

Waterhouse stop type foreshoot systems have a number of inherent disadvantages. First, the pinhole is not located at the diaphragm of the camera. Second, it is difficult to assure the alignment of the pinhole with the optical axis of the camera. Third, it is generally not possible to sychronize the positioning of the pinhole with the generation of a light flash. Fourth, the use of a Waterhouse slot permits dirt to enter the camera.

This invention relates to a foreshoot system in which a foreshoot aperture is formed in a member comprising a portion of a camera mechanism. In use, the member is moved out of a normal position to center the aperture on the optical axis of the camera and to close a light flash activating contact. The system eliminates the problems inherent in Waterhouse stop type foreshoot systems without material affecting either the cost or the operation of the camera.

SUMMARY OF THE INVENTION

In accordance with the preferred embodiment, this invention comprises a foreshoot system in which a foreshoot aperture is formed in a member comprising a portion of an exposing system. The member is activated to open the aperture and to simultaneously generate a signal indicative of the activation of the system to the foreshoot condition. Preferably, the member is either located at the diaphragm of the exposing system or includes a lens system that directs light passing through the aperture through a focal point located at the diaphragm.

DESCRIPTION OF THE DRAWINGS

A more complete understanding of the invention may be had by referring to the following detailed description when taken in conjunction with the drawings, wherein.

DETAILED DESCRIPTION

Figure 1:
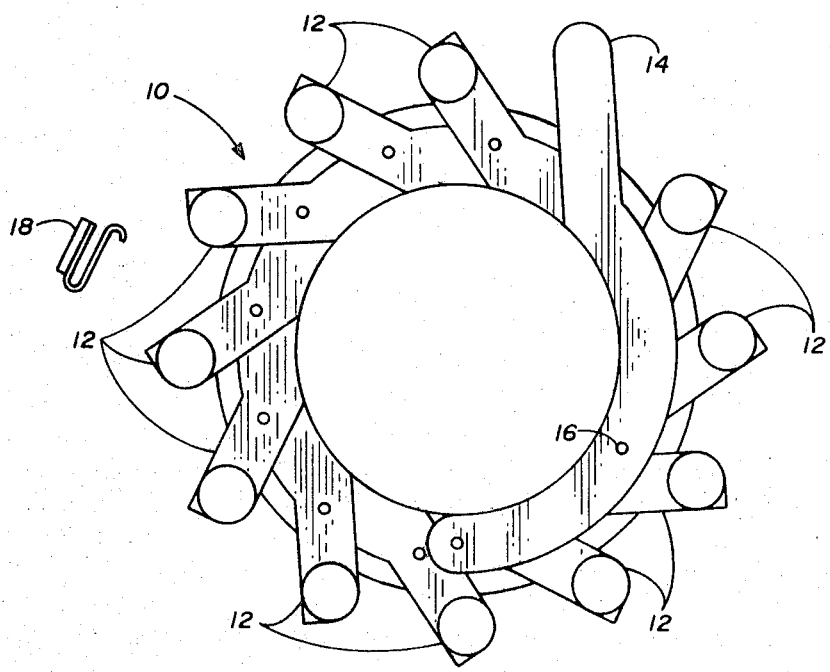
FIG. 1 is a front view of a first embodiment of the invention.
Figure 2:
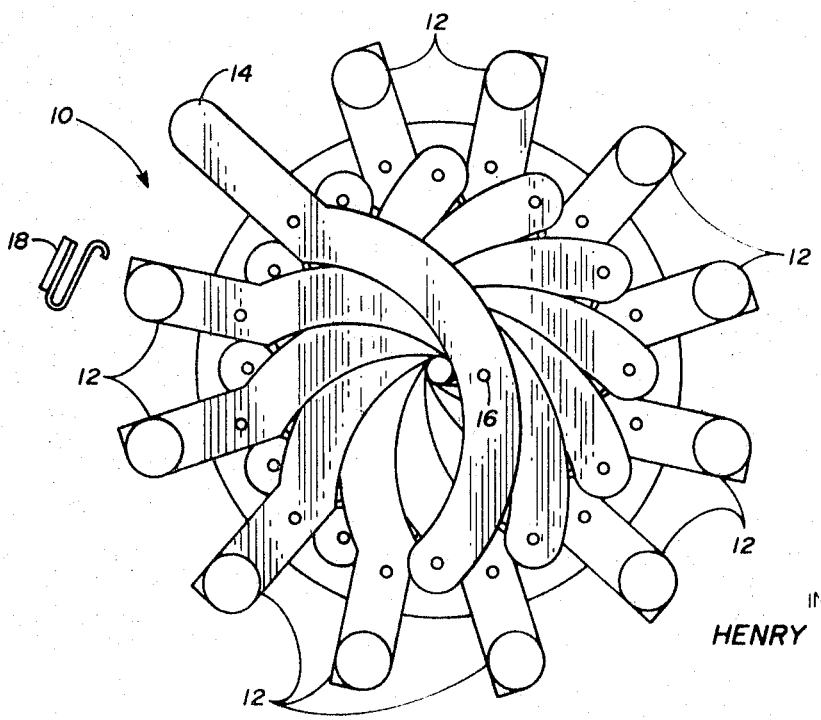
FIG. 2 is a view similar to FIG. 1 showing the first embodiment of the invention at another stage in its operation.
Figure 3:
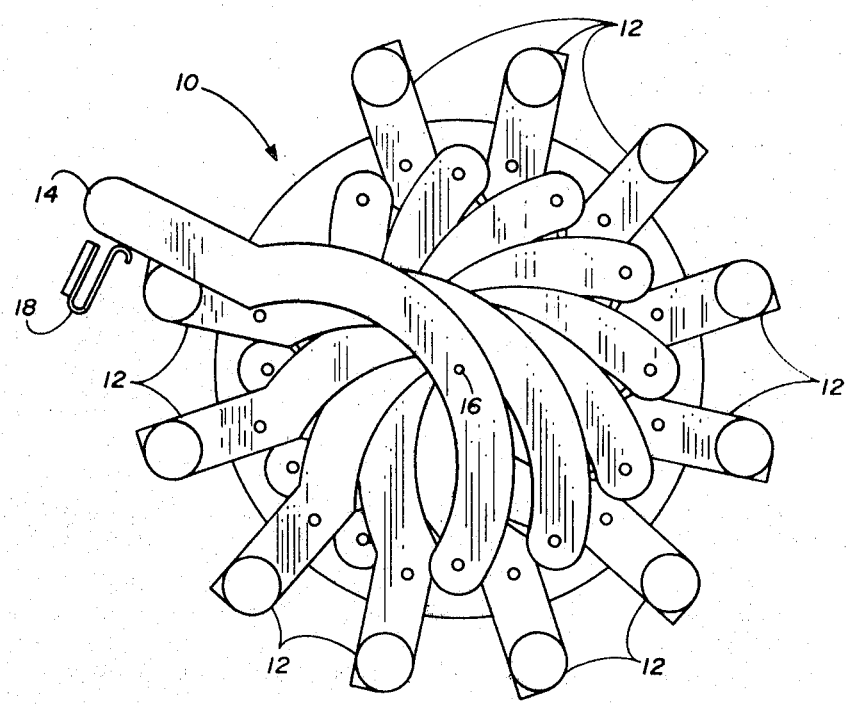
FIG. 3 is a view similar to FIGS. 1 and 2 showing the first embodiment at still another stage in its operation.
Figure 4:
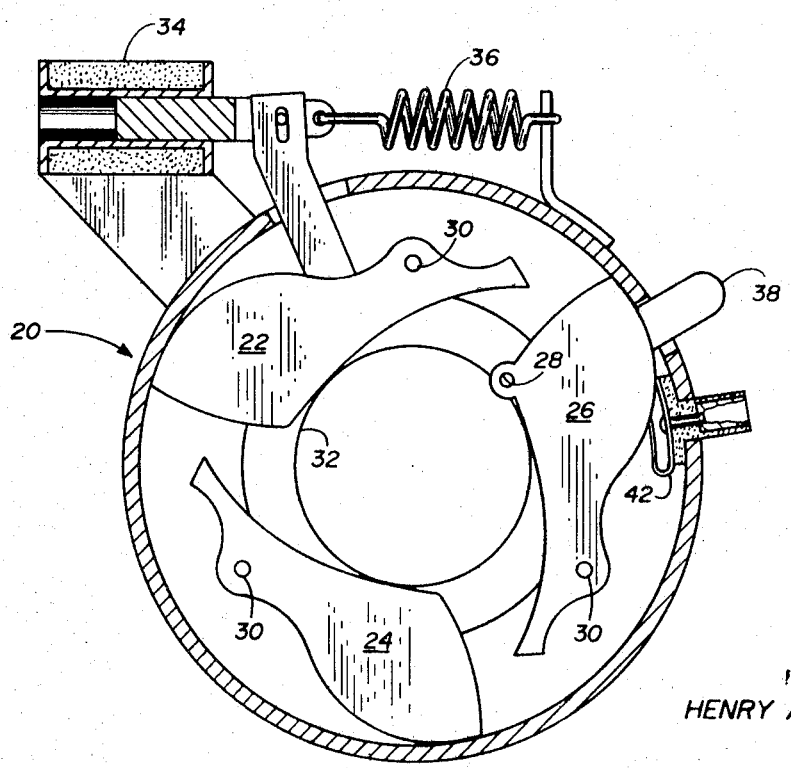
FIG. 4 is a front view of a second embodiment of the invention.
Figure 5:
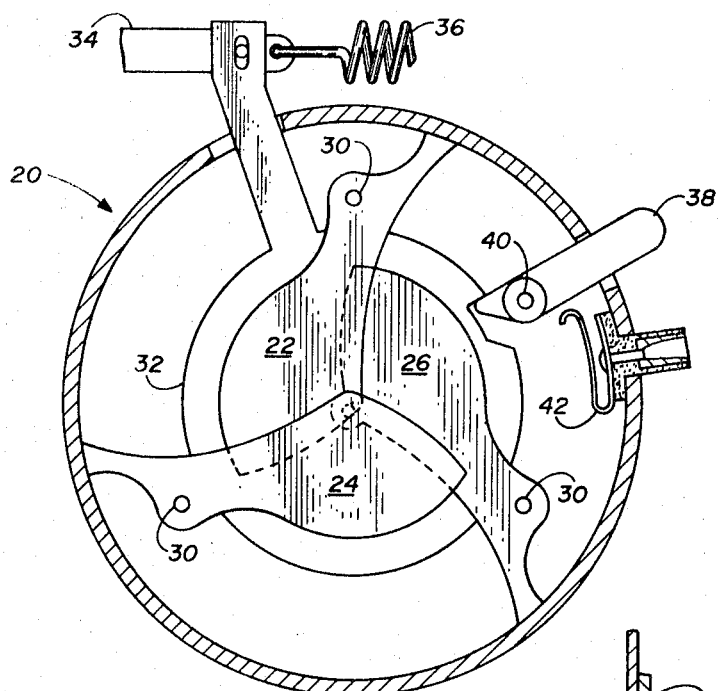
FIG. 5 is a view similar to FIG. 4 showing the second embodiment at another stage in its operation.

Referring now to the drawings, and particularly to FIGS. 1, 2 and 3 thereof, a first embodiment of the invention is shown. The first embodiment includes an iris diaphragm 10 which preferably comprises an element of a photographic emulsion exposing system, such as a camera. In such a case, the diaphragm 10 is positioned in a housing that also encloses a lens system and a shutter. The diaphragm 10 operates to control the quantity of light that flows through the exposing system to a photographic emulsion, such as a film or a photographic plate.

The iris diaphragm 10 is typical in that it includes a plurality of leaves 12. The leaves 12 are pivotally supported and are mounted for cooperative movement to form diaphragm openings of various sizes, the largest of which is shown in FIG. 1 and the smallest of which is shown in FIG. 2. The diaphragm 10 differs from prior iris diaphragms in that it includes a special foreshoot leaf 14.

The foreshoot leaf 14 is similar to the leaves 12 of the diaphragm 10 in that it cooperates with the leaves 12 to form the various diaphragm openings. The leaf 14 differs from the leaves 12 in several respects. First, the leaf 14 has a pinhole 16 formed through it. Second, the leaf 14 is mounted for movement beyond the position that it occupies when the leaves 12 form the smallest diaphragm opening. During the movement, the leaf 14 moves into the position shown in FIG. 3 wherein it covers the diaphragm opening and centers the pinhole 16 on the optical axis of the exposing system.

When the pinhole is properly positioned, the leaf 14 engages a contact 18 to produce a signal indicative of the actuation of the diaphragm 10 to the foreshoot condition.

In the use of the first embodiment of the invention, a foreshoot exposure is made by simply manipulating the foreshoot leaf 14 of the iris diaphragm 10 into the position shown in FIG. 3. The contact 18 is preferably coupled in series with a light flash actuating circuit so that the generation of the necessary light flash is synchronized with the opening of the foreshoot aperture. Since the pinhole 16 is formed in one of the leaves of the iris diaphragm, its positioning at the diaphragm of the exposing system and on the optical axis thereof is assured. And, since the pinhole is formed in an integral portion of the exposing system, the system may be completely sealed to prevent the entry of dirt and other foreign materials.

Referring now to FIGS. 4, 5, 6 and 7, a second embodiment of the invention is shown. The second embodiment includes a shutter mechanism 20 comprising three shutter blades 22, 24 and 26. The blades are typical except that the blade 26 has a foreshoot aperture 28 formed in it.

Each blade of the shutter mechanism 20 is supported in a camera body or the like by a pivot pin 30 and is pivotally secured to an actuating ring 32. The ring 32 is rotated by a solenoid 34 and a spring 36 to pivot the blades 22, 24 and 26 between the open position shown in FIG. 4 and the closed position in FIG. 5. When the blades are in the closed position, the blade 24 covers the foreshoot aperture 28.

The shutter mechanism 20 further includes a foreshoot lever 38 that is pivotally supported on a pin 40. The lever 38 extends into engagement with the ring 30 and accordingly, whenever the lever 38 is depressed, the ring 32 is pivoted against the action of the spring 36 to move the blades 22, 24 and 26 from the position shown in FIG. 5 to the position shown in FIG. 6. This action centers the foreshoot aperture 28 formed in the blade 26 on the optical axis of the shutter mechanism and simultaneously actuates the contact 42.

The second embodiment of the invention is operated to make a foreshoot exposure by depressing the foreshoot lever 36. This action automatically positions the foreshoot aperture 28 on the optical axis of the shutter system and simultaneously closes the contact 42. The contact 42 is preferably connected through a light flash generating circuit so that the necessary lightflash is generated simultaneously with the opening of the foreshoot aperture. Like the first embodiment of the invention, the second embodiment preferably comprises an integral portion of an exposing system so that use of the second embodiment eliminates the necessity of providing an opening into the system.

Figure 7:
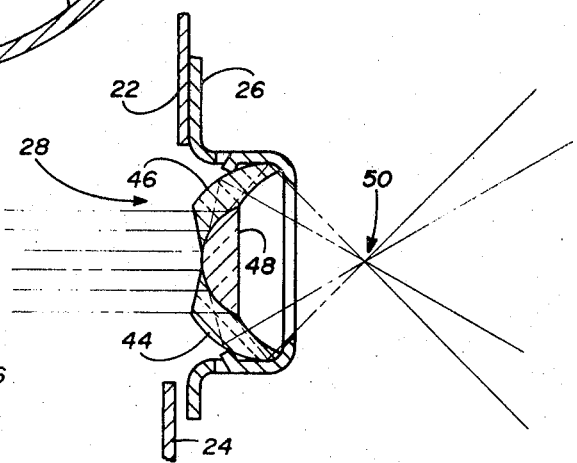
FIG. 7 is a sectional view of a portion of the second embodiment of the invention.
Figure 6:
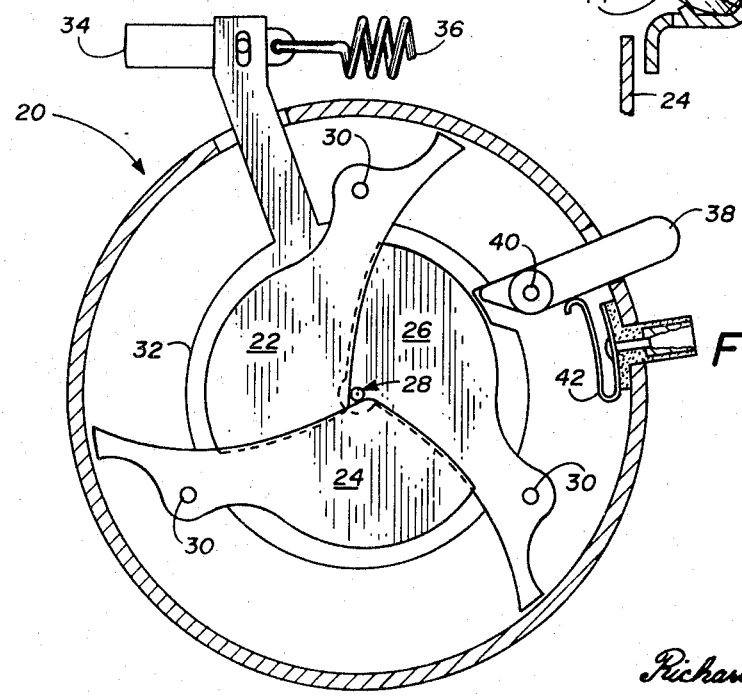
FIG. 6 is a view similar to FIGS. 4 and 5 showing the second embodiment at still another stage in its operation.

Referring now to FIG. 7, the structural details of the foreshoot aperture 28 of the second embodiment are shown. An optical system 44, including a positive lens 46 and a cardioid mirror 48, is positioned within the aperture 28. The system 44 directs light passing through the aperture 28 through a focal point 59. The optical system 44 is useful in the second embodiment because the shutter of an exposing system is seldom positioned at the diaphragm thereof. The system 44 operates to form a virtual pinhole at the diaphragm of an exposing system even though the aperture 28 is not located at the diaphragm.

In some exposing systems it is desirable to provide dual foreshoot apertures. In such a case, the first and second embodiments of the invention are combined into a single foreshoot system. Also, it has been found that polarization of the edges of a foreshoot exposure can be eliminated by rotating the emulsion around the optical axis of the exposing system during the foreshoot process.

It should be understood that the first embodiment of the invention can be adapted for use in diaphragms other than iris diaphragms. Likewise, the second embodiment can be adapted for use in shutter systems other than blade type shutter systems. Finally, the basic concept underlining both embodiments of the invention can be adapted for use in portions of exposing systems other than diaphragms and shutters.

Although only two embodiments of the invention are illustrated in the drawings and described herein, it will be understood that the invention is not limited to the embodiments disclosed but is capable of rearrangement, modification and substitution of parts and elements without departing from the spirit of the invention.

What is claimed is:

1. In a photographic emulsion exposing system of the type including a diaphragm mechanism and a shutter mechanism, a foreshoot system for pre-exposing the emulsion including:
    a member comprising a portion of the diaphragm mechanism and having a foreshoot apertured formed through it;
    means for manipulating the member to align the foreshoot aperture in the member with the optical axis of the diaphragm mechanism; and
    means for directing light through the foreshoot aperture to reduce the contrast of the emulsion.

2. In a photographic emulsion exposing system of the type including a diaphragm mechanism and a shutter mechanism, a foreshoot system for pre-exposing the emulsion including:
    a member comprising a portion of the shutter mechanism and having a foreshoot apertured formed through it;
    means for manipulating the member to align the foreshoot aperture in the member with the optical axis of the shutter mechanism; and
    means for directing light through the foreshoot aperture to reduce the contrast of the emulsion.

3. A foreshoot system for pre-exposing a photosensitive emulsion and thereby reducing the contrast of the emulsion including:
    an iris diaphragm comprising a plurality of leaves mounted for cooperation to form an opening,
    one of said leaves having a foreshoot aperture formed through it; and
    means for positioning the foreshoot aperture over the diaphragm opening.

4. The foreshoot system according to claim 3 wherein further including means for directing light through the system when the aperture is positioned over the opening.

5. The foreshoot system according to claim 3 wherein the leaves of the iris diaphragm are normally arranged in a predetermined array and wherein the positioning means moves the leaf having the aperture formed in it out of the array and into a position wherein it overlies the opening formed by the remaining leaves.

6. A foreshoot system for pre-exposing a photographic emulsion to reduce the contrast of the emulsion including:
    a shutter mechanism comprising a plurality of blades mounted for movement between open and closed positions,
    one of said blades having a foreshoot aperture formed through it; and
    means for partially opening the blades and for simultaneously aligning the foreshoot aperture with the optical axis of the shutter mechanism.

7. The foreshoot system according to claim 6 further including electrical contact means mounted for actuation whenever the foreshoot aperture is aligned with the optical axis of the shutter mechanism.

8. The foreshoot system according to claim 6 further including a lens system mounted in the foreshoot aperture for directing light through a focal point displaced from the shutter mechanism.

9. A foreshoot system for pre-exposing a photographic emulsion and thereby reducing the contrast of the emulsion including:
    a plurality of members mounted around an optical axis for cooperative movement between a relatively open position and a relatively closed position,
    one of said members having a foreshoot aperture formed through it;
    means for positioning the foreshoot aperture in alignment with the optical axis; and
    means for directing light through the foreshoot aperture.

10. The foreshoot system according to claim 9 wherein the light directing means includes a flash actuating electrical contact mounted for actuation whenever the foreshoot aperture is positioned in alignment with the optical axis.

11. The foreshoot system according to claim 9 wherein the members comprise the leaves of an iris diaphragm, wherein the foreshoot aperture is formed through one of the leaves, and wherein said one of the leaves is mounted for movement independently of the remaining leaves to position the foreshoot aperture in alignment with the optical axis.

12. The foreshoot system according to claim 9 wherein the members comprise the blades of a shutter, wherein the foreshoot aperture is formed through one of the blades, and wherein the blades are mounted for cooperative movement to a partially open position in which the foreshoot aperture is aligned with the optical axis.

13. The foreshoot system according to claim 9 further including a lens system mounted in the foreshoot aperture for directing light through a focal point that is axially displaced from the members.

References Cited
UNITED STATES PATENTS

| | | | |
|---|---|---|---|
| 2,944,477 | 7/1960 | Tesch | 95—64 |
| 3,259,043 | 7/1966 | Pagez | 95—64 X |
| 3,309,978 | 3/1967 | Kiper | 95—64 |
| 3,484,165 | 12/1969 | Denner | 355—67 |

JOHN M. HORAN, Primary Examiner

T. A. MAURO, Assistant Examiner

U.S. Cl. X.R.

95—64